(12) United States Patent
Gonzalez Salazar et al.

(10) Patent No.: US 9,938,944 B2
(45) Date of Patent: Apr. 10, 2018

(54) SYSTEM INCLUDING DUEL FUEL INJECTION ENGINE AND METHOD OF OPERATION

(71) Applicant: General Electric Company, Schenectady, NY (US)

(72) Inventors: Miguel Angel Gonzalez Salazar, Munich (DE); Guillaume Becquin, Munich (DE)

(73) Assignee: General Electric Company, Niskayuna, NY (US)

( * ) Notice: Subject to any disclaimer, the term of this patent is extended or adjusted under 35 U.S.C. 154(b) by 125 days.

(21) Appl. No.: 14/951,700

(22) Filed: Nov. 25, 2015

(65) Prior Publication Data

US 2017/0145970 A1    May 25, 2017

(51) Int. Cl.
    F02M 43/02    (2006.01)
    F02M 43/04    (2006.01)
    F02B 43/10    (2006.01)

(52) U.S. Cl.
    CPC ............. *F02M 43/02* (2013.01); *F02B 43/10* (2013.01); *F02M 43/04* (2013.01); *F02B 2043/103* (2013.01); *F02B 2201/064* (2013.01)

(58) Field of Classification Search
    CPC ............. F02D 41/0025; F02D 19/0647; F02D 41/0027; F02D 19/081; F02D 41/3094; F02D 19/0642; F02D 19/06; F02D 19/0694; F02D 19/08; F02D 2200/0611; F02M 21/0215; F02M 43/00; F02M 21/02; F02B 2043/103
    See application file for complete search history.

(56) References Cited

U.S. PATENT DOCUMENTS

| 2,529,312 A | 11/1950 | Rupp |
| 4,372,753 A | 2/1983 | Narasimhan, Jr. et al. |
| 5,268,008 A | 12/1993 | Kanne |

(Continued)

FOREIGN PATENT DOCUMENTS

| CA | 2120296 A1 | 10/1995 |
| CN | 1110710 A | 10/1995 |

OTHER PUBLICATIONS

Zhang et al., "An Experimental Study on Steady Spray Characteristics of Diesel Fuels Containing Dissolved CH4", available on www.paper.edu.cn, 1966, 7 Pages.

(Continued)

*Primary Examiner* — Long T Tran
(74) *Attorney, Agent, or Firm* — John P. Darling

(57) ABSTRACT

A system 10 and method of operating the system 10 are disclosed. The system 10 includes a compressor 20, a combustion engine 30, and an input system 60. The compressor 20 is configured to mix and compress a liquid hydrocarbon fuel 15 and a first hydrocarbon gas fuel 17, thereby to form a liquid fuel mixture 21. The combustion engine 30 is disposed downstream of the compressor 20 and includes a dual fuel injection system 40 and a combustion chamber 50. The dual fuel injection system 40 includes a nozzle 42 that is configured to inject the liquid fuel mixture 21 into the combustion chamber 50 of the combustion engine 30. The input system 60 is fluidly connected with the combustion engine 30, and configured to inject air 62 and a second hydrocarbon gas fuel 64 into the combustion chamber 50.

20 Claims, 4 Drawing Sheets

(56) References Cited

U.S. PATENT DOCUMENTS

| | | | |
|---|---|---|---|
| 5,290,325 A | 3/1994 | Kanne et al. | |
| 5,315,054 A | 5/1994 | Teel | |
| 7,007,669 B1* | 3/2006 | Willi | F02D 13/0269 |
| | | | 123/305 |
| 7,282,603 B2 | 10/2007 | Richards | |
| 8,469,009 B2* | 6/2013 | Munshi | C10L 3/06 |
| | | | 123/525 |
| 8,516,818 B2* | 8/2013 | Sisco | C06D 5/00 |
| | | | 60/39.17 |
| 2002/0026926 A1* | 3/2002 | Loye | F02B 1/12 |
| | | | 123/435 |
| 2012/0160221 A1* | 6/2012 | Munshi | C10L 3/06 |
| | | | 123/575 |
| 2013/0269243 A1 | 10/2013 | Lund | |
| 2014/0020773 A1* | 1/2014 | Sommars | F02M 43/04 |
| | | | 137/511 |
| 2014/0238340 A1* | 8/2014 | Dunn | F02M 43/00 |
| | | | 123/299 |
| 2015/0000460 A1* | 1/2015 | Carrasco Vergara | B62M 3/16 |
| | | | 74/594.2 |
| 2015/0000640 A1* | 1/2015 | Bandyopadhyay | F02B 25/06 |
| | | | 123/470 |
| 2015/0233310 A1* | 8/2015 | Zhang | F02D 19/06 |
| | | | 701/54 |
| 2015/0275755 A1* | 10/2015 | Ogata | F02C 3/22 |
| | | | 60/39.463 |

OTHER PUBLICATIONS

Zhang et al., "Performance and Emissions of Direct Injection Diesel Engine Fueled with Diesel Fuel Containing Dissolved Methane", Energy & Fuels, 2006, vol. 20, Issue 2, pp. 504-511.

Patterson et al., "An evaluation of the policy and techno-economic factors affecting the potential for biogas upgrading for transport fuel use in the UK", Energy Policy, Science Direct, Mar. 2011, vol. 39, Issue 3, pp. 1806-1816.

* cited by examiner

SYSTEM INCLUDING DUEL FUEL INJECTION ENGINE AND METHOD OF OPERATION

BACKGROUND

This invention relates generally to systems including combustion engines, and more particularly to systems including a dual fuel combustion engine and method of operation of such a system.

In combustion engine applications, a combustor that is capable of operating on a gas fuel, a liquid fuel, or a mixture of both gas fuel and liquid fuel may be desirable. For example, by replacing a fraction of the liquid fuel by a gaseous fuel, it may be possible to achieve a reduction in emissions that is proportional to the dissolved fraction of gas fuel in liquid fuel. Further, because of lower emissions, combustion may be carried out at higher temperatures leading to an increase in an overall efficiency of the combustion engine. Such fuel flexibility, however, often requires complex and costly fuel injection systems that may sacrifice operability or performance when operating on one type of fuel or the other. Moreover, adapting such fuel injection systems in current combustion engines may present substantial challenges in fuel injection, as well as in maintaining nitrogen oxides and other types of regulated emissions below mandated levels. Since liquid fuels are about fifty times denser than gas fuels, the injection ports and fuel delivery networks required to inject liquid fuel would need to be much smaller and more complex than those typically used to inject gas fuel in a similar manner. There, is thus a need for an improved dual fuel combustion engines configured to inject gas fuel along with a liquid fuel into the combustor during operation.

BRIEF DESCRIPTION

In one embodiment, a system including a compressor, a combustion engine, and an input system is disclosed. The compressor is configured to mix and compress a liquid hydrocarbon fuel and a first hydrocarbon gas fuel, thereby dissolving at least a portion of the first hydrocarbon gas fuel in the liquid hydrocarbon fuel to form a liquid fuel mixture. The combustion engine is disposed downstream of the compressor and includes a dual fuel injection system and a combustion chamber. The dual fuel injection system includes a nozzle that is configured to inject the liquid fuel mixture into the combustion chamber of the combustion engine. The input system is fluidly connected with the combustion engine, and configured to inject air and a second hydrocarbon gas fuel into the combustion chamber.

In one embodiment, a system including a compressor, a combustion engine, and an input system is disclosed. The compressor is configured to mix and compress diesel and a first methane gas, thereby dissolving at least a portion of the first methane gas in the diesel to form a liquid fuel mixture. The combustion engine is disposed downstream of the compressor and includes a dual fuel injection system and a combustion chamber. The dual fuel injection system includes a nozzle that is configured to inject the liquid fuel mixture into the combustion chamber of the combustion engine. The input system includes a pre-mixer configured to mix air and a second methane gas to produce a gas fuel mixture, and is fluidly connected with the combustion engine. The input system is configured to inject the gas fuel mixture into the combustion chamber.

In one embodiment, a method is disclosed. The method includes mixing and compressing a liquid hydrocarbon fuel and a first hydrocarbon gas fuel in a compressor thereby dissolving at least a portion of the first hydrocarbon gas fuel in the liquid hydrocarbon fuel to form a liquid fuel mixture, injecting the liquid fuel mixture into a combustion chamber of a combustion engine through a nozzle of a dual fuel injection system of the combustion engine, and injecting air and a second hydrocarbon gas fuel into the combustion chamber through an input system.

DRAWINGS

These and other advantages and features will be more readily understood from the following detailed description of preferred embodiments of the invention that is provided in connection with the accompanying drawings.

DETAILED DESCRIPTION

Aspects of the present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

In the following description, whenever a particular aspect or feature of an embodiment of the invention is said to comprise or consist of at least one element of a group and combinations thereof, it is understood that the aspect or feature may comprise or consist of any of the elements of the group, either individually or in combination with any of the other elements of that group.

In the following specification and the claims that follow, the singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" or "substantially," may not be limited to the precise value specified, and may include values that differ from the specified value. In at least some instances, the approximating language may correspond to the precision of an instrument for measuring the value.

In some embodiments, a system including a dual fuel engine is presented. The dual fuel engine utilizes a liquid fuel mixture (that has a gaseous fuel dissolved in a liquid hydrocarbon fuel), air, and an additional gaseous fuel in the combustion chamber.

Figure 1:
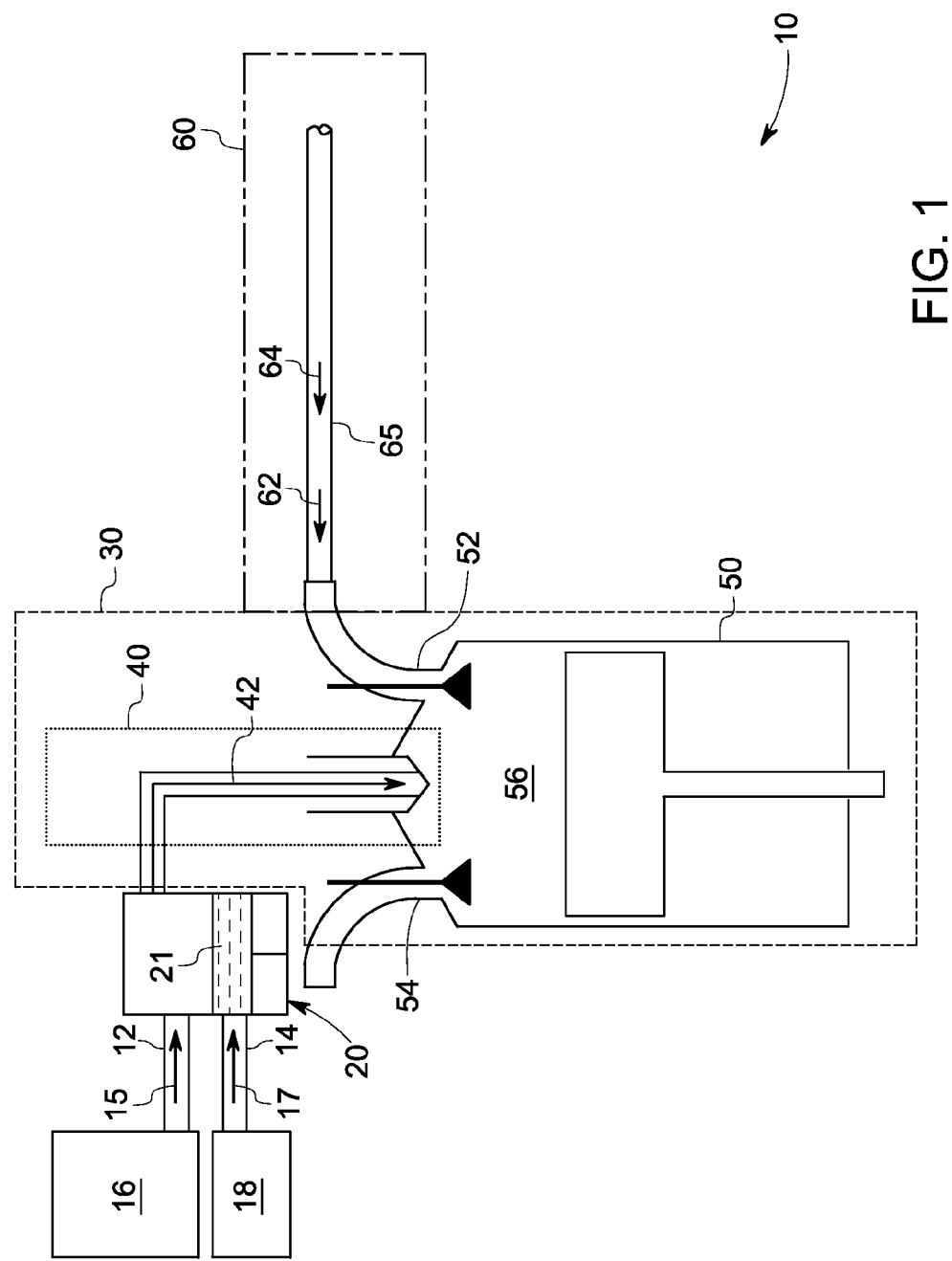
FIG. 1 is a perspective view of a system including a compressor, combustion engine, and an input system, according to an embodiment of the present invention.

FIG. 1 schematically represents a system 10 in accordance with some embodiments of the present invention. The system includes a compressor 20, a combustion engine 30, and an input system 60. The combustion engine 30 is disposed downstream of the compressor 20 and is fluidly connected to the input system 60. The compressor 20 is configured to mix and compress a liquid hydrocarbon fuel 15 and a first hydrocarbon gas fuel 17, thereby dissolving at least a portion of the first hydrocarbon gas fuel 17 in the liquid hydrocarbon fuel 15 to form a liquid fuel mixture 21. The combustion engine 30 that is disposed downstream of the compressor 20 includes a dual fuel injection system 40 and a combustion chamber 50. The dual fuel injection system 40 includes a nozzle 42 that is configured to inject the liquid fuel mixture into the combustion chamber 50. The input system 60 is configured to inject air 62 and a second hydrocarbon gas fuel 64 into the combustion chamber 50.

Some embodiments of the invention also present a method of operation of the system 10. The method includes mixing and compressing the liquid hydrocarbon fuel 15 and the first hydrocarbon gas fuel 17 in the compressor 20 thereby dissolving at least a portion of the first hydrocarbon gas fuel 17 in the liquid hydrocarbon fuel 15 to form the liquid fuel mixture 21. The method further includes injecting the liquid fuel mixture 21 into the combustion chamber 50 of the combustion engine 30 through the nozzle 42 of the dual fuel injection system 40. Air 62 and the second hydrocarbon gas fuel 64 are further injected into the combustion chamber 50 through the input system 60.

The compressor 20 may include a liquid hydrocarbon fuel inlet 12 and a first hydrocarbon gas fuel inlet 14. The compressor 20 may be configured to receive the liquid hydrocarbon fuel 15 from a liquid hydrocarbon fuel source 16 through the liquid hydrocarbon fuel inlet 12, and may further be configured to receive the first hydrocarbon gas fuel 17 from a first hydrocarbon gas fuel source 18 through the first hydrocarbon gas fuel inlet 14. During operation of the system 10, the liquid hydrocarbon fuel 15 and the first hydrocarbon gas fuel 17 are mixed and compressed in the compressor 20 to dissolve at least a portion of the first hydrocarbon gas fuel 17 in the liquid hydrocarbon fuel 15 to form the liquid fuel mixture 21.

Figure 2:
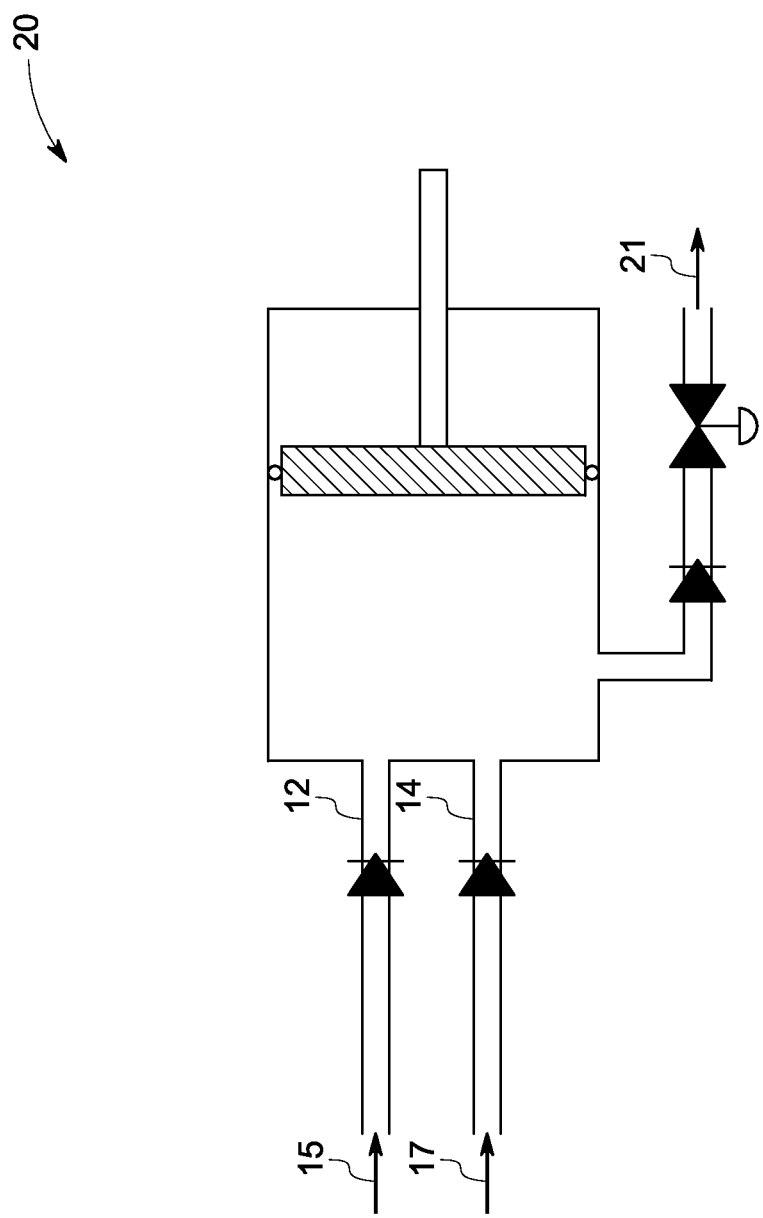
FIG. 2 is a perspective view of a two phase compressor, according to an embodiment of the present invention.

In general, solubility of gas hydrocarbons in liquid hydrocarbon fuels is directly proportional to pressure and inversely proportional to temperature. Thus, solubility of gas hydrocarbons in liquid hydrocarbon fuels at atmospheric temperature may be enhanced by pressurizing. Various compressor configurations may be used for pressurization of the gas hydrocarbons and the liquid hydrocarbon fuels, and for facilitating the dissolution process. In some embodiments, the liquid hydrocarbon fuel 15 and the first hydrocarbon gas fuel 17 may be mixed and then pressurized using a two-phase compressor, as shown in FIG. 2. A two-phase compressor is a compression device that pressurizes fluids in which two phases are simultaneously occurring. In some embodiments, the two phases used in the two-phase compressor 20 are the liquid phase including the liquid hydrocarbon fuel 15 and the gas phase including the first hydrocarbon gas fuel 17. The two phase compressor 20 allows for operation in the two-phase flow region that is difficult to be addressed by single-flow compressors. Non limiting examples of two-phase compressors include positive displacement devices, combinations of multiple positive displacement compressors and combinations of positive displacement compressors along with other conventional compressors. Non limiting examples of positive displacement devices include reciprocating pistons, screw compressors, and rotary vane compressors. In certain embodiments, liquid fuel mixture may be further cooled using internal cooler, external refrigeration, or a combination of both. These pressurization and cooling steps may be repeated to obtain a desired quantity of gas hydrocarbon fuel dissolved in the liquid hydrocarbon fuel.

In some embodiments, as shown in FIG. 2, the first hydrocarbon gas fuel 17 that enters through the first hydrocarbon gas fuel inlet 14 of the compressor 20 is mixed with the liquid hydrocarbon fuel 15 that enters through the liquid hydrocarbon fuel inlet 16. Mixing the first hydrocarbon gas fuel 17 and the liquid hydrocarbon fuel 15 before the compression is particularly advantageous, as a more homogenous mixture is available for the compression. In some embodiments, mixing of the liquid hydrocarbon fuel 15 and first hydrocarbon gas fuel 17 may occur by spraying the liquid hydrocarbon fuel 15 on to the first hydrocarbon gas fuel 17, for example, through an injection fuel nozzle (not shown). In some embodiments a pressure of the liquid hydrocarbon fuel 15 may be slightly increased through a pump (not shown), as compared to the first hydrocarbon gas fuel 15, before entering the compressor 20. In some embodiments, mixing and compressing may occur in two separate and consecutive chambers of the compressor 20. In some other embodiments, mixing and compressing may occur in a single chamber of the compressor 20. In some embodiments, the temperature of the mixture of the liquid hydrocarbon fuel 15 and the first hydrocarbon gas fuel 17 may be optionally reduced to a value below atmospheric pressure through an external refrigeration unit, in order to further enhance the solubility of the first hydrocarbon gas fuel 17 in the liquid hydrocarbon fuel 15.

The mixed liquid hydrocarbon fuel 15 and the first hydrocarbon gas fuel 17 may be compressed at increasing pressures in the compressor 20. As the compression pressure increases, solubility of the first hydrocarbon gas fuel 17 in the liquid hydrocarbon fuel 15 increases and the amount of the first hydrocarbon gas fuel 17, which need to be compressed decreases, thereby reducing the compressor duty. At certain pressures, the first hydrocarbon gas fuel 17 starts dissolving in the liquid hydrocarbon fuel 15 forming the liquid fuel mixture 21. In some embodiments, the compression duty of the compressor 20 may be divided into various consecutive steps. The compressor 20 may be optionally cooled to aid the dissolution process. In some embodiments, the dissolution process of first hydrocarbon gas fuel 17 in the liquid hydrocarbon fuel 15 may be enhanced, by cooling down the mixture of the liquid hydrocarbon fuel 15 and the first hydrocarbon gas fuel 17 in between different compression steps. In some embodiments, pressurizing the compressor 20 before mixing the first hydrocarbon gas fuel 17 with the liquid hydrocarbon fuel 15 may further aid in dissolution of the first hydrocarbon gas fuel 17 in the liquid hydrocarbon fuel 15.

The term "liquid fuel mixture" 21 as used refers to the dissolved state of the first hydrocarbon gas fuel 17 in the liquid hydrocarbon fuel 15. Without being bound by any theory, it is believed that in the dissolved state, the molecules of the first hydrocarbon gas fuel 17 may be trapped in the volume occupied by the liquid hydrocarbon fuel. Therefore, the first hydrocarbon gas fuel 17 dissolved in the liquid hydrocarbon fuel 15 is different from just a mixture of the first hydrocarbon gas fuel 17 and the liquid hydrocarbon fuel 15, as in the latter, the molecules of the first hydrocarbon gas fuel 17 and the liquid hydrocarbon fuel 15 may be occupying spaced out volumes in any container, such as, the compressor 20. Further, liquid fuel mixture 21 is different from a mixture of liquefied first hydrocarbon gas fuel 17 and the liquid hydrocarbon fuel 15. In a mixture of liquefied first hydrocarbon gas fuel 17 and the liquid hydrocarbon fuel 15, the first hydrocarbon gas fuel 17 is itself in a liquid form and may be mixed with the liquid hydrocarbon fuel 15. In contrast, in some of the embodiments disclosed herein, the first hydrocarbon gas fuel 17 molecules would still be in gaseous state, but are absorbed within the liquid hydrocarbon fuel 15 and, for all practical purposes, the liquid fuel mixture 21 having the first hydrocarbon gas fuel 17 dissolved in the liquid hydrocarbon fuel 15 behaves like a single liquid, thereby making the transportation and injection of this liquid fuel mixture 21 simpler than a gas-liquid mixture.

The first hydrocarbon gas fuel 17 may include any suitable hydrocarbon that is present in a gaseous state at atmospheric pressure and temperature. Non limiting examples of a first hydrocarbon gas fuel 17 include methane, propane, ethane, hydrogen, or combinations thereof. A liquid hydrocarbon fuel 15 as used herein may include any hydrocarbon that is present in a liquid state at atmospheric pressure and temperature. In some embodiments, alkanes, alkenes, cycloalkanes, or alkyne-based compounds may be included in the liquid hydrocarbon fuels. Non limiting examples of a liquid hydrocarbon fuel 15 include diesel, gasoline, kerosene, jet fuel, or combinations thereof.

In certain embodiments, the liquid hydrocarbon fuel 15 may include diesel. In certain embodiments, the first hydrocarbon gas fuel 17 may include methane. In some embodiments, the liquid hydrocarbon fuel 15 may include at least 75 wt % of diesel and the first hydrocarbon gas fuel 17 may include at least 75 wt % of methane. In certain embodiments, the liquid hydrocarbon fuel 15 may include diesel in a range from about 75 wt % to about 100 wt %, and the first hydrocarbon gas fuel 17 may include methane in a range from about 75 wt % to about 100 wt %. In some embodiments, the liquid hydrocarbon fuel 15 may include diesel in a range from about 90 wt % to about 100 wt %, and the first hydrocarbon gas fuel 17 may include methane in a range from about 90 wt % to about 100 wt %. In some embodiments, the liquid hydrocarbon fuel 15 consists essentially of diesel and the first hydrocarbon gas fuel 17 consists essentially of methane. The term "consists essentially" as used in this context means that any impurities that are present in the diesel and the methane respectively are incidental and would not affect the performance of the compressor 20 or the combustion engine 30.

The percentage of dissolution of the first hydrocarbon gas fuel 17 in the liquid hydrocarbon fuel 15 may vary with the pressure used for compression. A lower compression pressure may be sufficient to dissolve lower amounts of the first hydrocarbon gas fuel 17 into the liquid hydrocarbon fuel. For example, a 25 MPa pressure may be sufficient to dissolve about 10 wt % of the first hydrocarbon gas fuel 17 in the liquid hydrocarbon fuel 15 to form the liquid fuel mixture 21, while a pressure greater than 120 MPa, at atmospheric temperature, may be desirable to obtain a liquid fuel mixture 21 that includes greater than about 40 wt % of the first hydrocarbon gas fuel 17. In some embodiments, the percentage of the first hydrocarbon gas fuel 17 dissolved in the liquid hydrocarbon fuel 15 may be regulated by controlling the pressure used for the compression in the compressor 20.

In some embodiments, the method may include compressing the liquid hydrocarbon fuel 15 and the first hydrocarbon gas fuel 17 in the compressor 20 at a pressure in a range from about 5 MPa to about 250 MPa. In certain embodiments, the liquid hydrocarbon fuel 15 and the first hydrocarbon gas fuel 17 may be compressed in the compressor 20 at a pressure in a range from about 100 MPa to about 250 MPa. The temperature of the compressor 20 may be maintained in a range from about −160° C. to about 200° C., during one or both of the mixing and the compressing steps. In some embodiments, the method may include maintaining a temperature of the compressor in a range from about −160° C. to about 200° C. during one or both of the mixing and the compressing steps. In certain embodiments, the temperature of the compressor 20 may be maintained in a range from about −160° C. to about 50° C., during one or both of the mixing and the compressing steps. In some embodiments, the mixing and compression of the liquid hydrocarbon fuel 15 and the first hydrocarbon gas fuel 17 may be carried out at at room temperature.

In some embodiments, a weight ratio of the first hydrocarbon gas fuel 17 to the liquid hydrocarbon fuel 15 in the compressor 20 may be in a range from about 1:99 to about 1:1. In some embodiments, the liquid hydrocarbon fuel mixture 21 may include the first hydrocarbon gas fuel 17 in an amount in a range from about 1 wt. % to about 50 wt. % of the liquid fuel mixture 21. In some embodiments, the amount of first hydrocarbon gas fuel 17 present in the liquid fuel mixture 21 may be greater than about 30 wt %. In one embodiment, the liquid fuel mixture 21 may include greater than 35 wt % of the first hydrocarbon gas fuel 17.

As mentioned earlier, the compressor 20 is configured to mix and compress the liquid hydrocarbon fuel 15 and the first hydrocarbon gas fuel 17 to form the liquid fuel mixture 21 that may be combusted in the combustion chamber 50 of the combustion engine 30. The compressor 20 may be located proximate to the combustion engine 30 or may be located at a distant location. In some embodiments, the actual mixing and dissolving of the first hydrocarbon gas fuel 17 in the liquid hydrocarbon fuel 15 using a compressor 20 may be carried out at a distant location and the liquid fuel mixture 21 may be transported to the combustion engine 30 for further use. Mixing and dissolving the first hydrocarbon gas fuel 17 in the liquid hydrocarbon fuel 15 may facilitate transportation of the first hydrocarbon gas fuel at atmospheric temperature and pressure equivalent to those of compressed natural gas (CNG).

As is shown in FIG. 1, the system 10 further includes a dual fuel injection system 40 positioned upstream of the combustion chamber 50. The dual fuel injection system 40 is configured to be in fluid communication with the compressor 20, and may be configured to inject liquid fuel mixture 21 into the combustor 50 during operation of the system 10. During operation, the liquid fuel mixture 21 may pass through the nozzle 42 of the dual fuel injection system 40, in a liquid state and may be sprayed into the combustion chamber 50. Any number of nozzles 42 may be used in the combustion engine 30. The nozzle 42 may be attached to an end cover of the combustion chamber 50 (not shown) or may extend downstream therefrom into a combustion zone 56 of the combustion chamber 50 as shown in FIG. 1.

Figure 3:
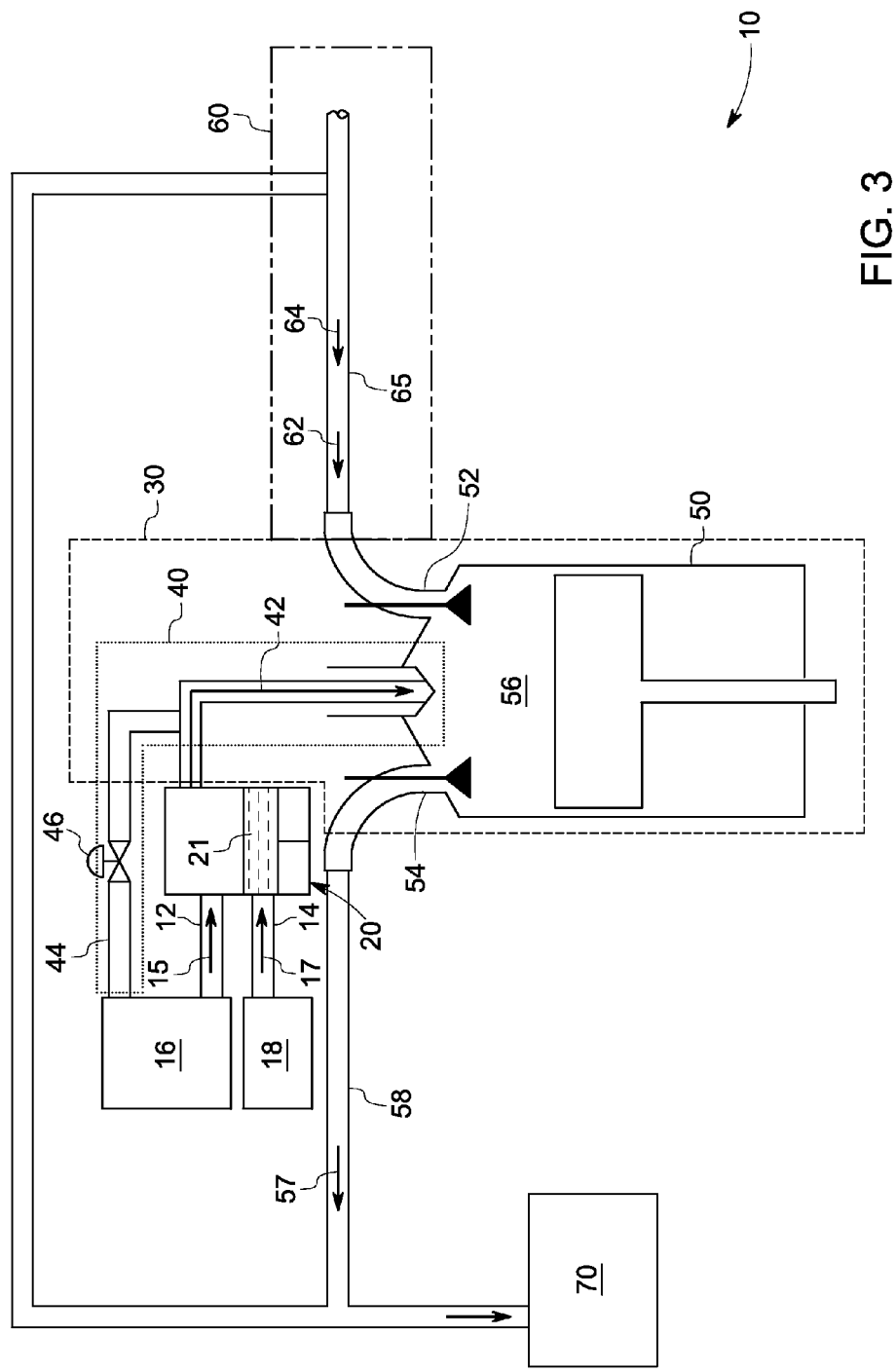
FIG. 3 is a perspective view of a system including a compressor, combustion engine, and an input system, according to an embodiment of the present invention.

The dual fuel injection system 40 used herein is capable of injecting a liquid fuel or the liquid fuel mixture 21 into the combustion chamber 50. In some embodiments, the dual fuel injection system 40 may be configured to inject a liquid fuel into the combustor 50 when it is desirable to operate the combustor 50 entirely using a liquid fuel. In a non-limiting example, the combustor 50 may be operated entirely using a liquid fuel during starting of the combustion engine, where a pilot liquid fuel is used as a source of ignition. The ignited liquid fuel may serve to establish a number of flame-fronts in the combustion chamber 50. In some such instances, referring now to FIG. 3, the dual fuel injection system 40 may include a liquid hydrocarbon fuel conduit 44 fluidly connecting a liquid fuel source to the nozzle 42 via a control valve 46. The liquid fuel source used may be same as the liquid hydrocarbon fuel source 16 that is used for the supply of liquid hydrocarbon fuel 15 into the compressor 20 for the dissolution of the first hydrocarbon gas fuel 17 as shown in FIG. 3, or may be a different liquid fuel source. The dual fuel injection system 40 may be configured to inject any liquid fuel, such as, diesel fuel, kerosene, ethanol, or water and oil mixture into the combustion chamber 50, for combustion therein. In some embodiments, the conduit 44 may directly connect the liquid hydrocarbon fuel source 16 or the liquid hydrocarbon fuel inlet 12 to the nozzle 42, thereby bypassing the compressor 20.

In some embodiments, during operation of the system 10, the nozzle 42 may inject a fuel that is essentially in a liquid form. As used herein, the term "nozzle 42 injects a fuel that is essentially in a liquid form" means that an amount of any free form of gaseous fuel transiting through the nozzle 42 during operation of the system 10 is only incidental and does not affect the operation of the system 10. In some embodiments, the nozzle 42 may be configured to inject the liquid fuel mixture 21 into the combustion chamber at a flow rate in a range from about 0.01% to about 100% of a nominal flow rate. As used herein, the term "nominal flow rate" refers to the flow rate of a fuel passing through the nozzle at the standard operating pressure of the combustion engine 30, and a "percentage of the nominal flow rate" (alternately "percentage nominal flow rate") refers to the flow rate that is maintained in the nozzle during the current operation, and is disclosed as a percentage value of the nominal flow rate. In some embodiments, the method includes injecting the liquid fuel mixture into the combustion chamber at a flow rate in a range from about 0.01% to about 100% of a nominal flow rate.

While the embodiments described above allow for the usage of a liquid hydrocarbon fuel 15 and a first hydrocarbon gas fuel 17 for combustion in the combustion chamber 50, the dissolution of first hydrocarbon gas fuel 17 in the liquid hydrocarbon fuel 15 may be limited to about 50 wt % of the liquid fuel mixture 21, in some embodiments. It may be desirable to supplement the liquid fuel mixture 21 in the combustion chamber 50 with additional gaseous fuel, which may further lower the nitrogen oxides (NOx) emission and increase efficiency of the system 10. Therefore, as shown in FIGS. 1 and 2, the system 10 further includes an input system 60 configured to inject air 62 and a second hydrocarbon gas fuel 64 into the combustion chamber 50.

The term "air" 62 as used herein refers to natural air, $O_2$-enriched air, oxygen ($O_2$) or other oxidizer. In some embodiments, air 62 may be atmospheric or ambient air and may be drawn-in through the combustion chamber inlet 52 (see FIGS. 1 and 2). In some embodiments, air 62 may be filtered before entering the combustion chamber 50. In some embodiments, air 62 may be stored in a compressed air cylinder (not shown), or the like; or be routed to a compressor or pump ahead of the combustion chamber inlet 52 so as to be pressurized before being introduced to the combustion chamber 50.

The second hydrocarbon gas fuel 64 may be also be injected through the combustion chamber inlet 52 as shown in FIGS. 1 and 2, or may be injected through a separate combustion chamber inlet (not shown). In some embodiments, the second hydrocarbon gas 64 may be optionally pressurized to assist efficient combustion.

The second hydrocarbon gas fuel 64 may have same chemical composition as that of the first hydrocarbon gas fuel 17, or may be different. Non-limiting examples of a second hydrocarbon gas fuel 64 include methane, propane, ethane, hydrogen, or combinations thereof. In certain embodiments, at least one of the first hydrocarbon gas fuel 17 and the second hydrocarbon gas fuel 64 may include methane. In some embodiments, both the first hydrocarbon gas fuel 17 and the second hydrocarbon gas fuel 64 may include methane. In one embodiment, both the first hydrocarbon gas fuel 17 and the second hydrocarbon gas fuel 64 consist essentially of methane. The phrase "the first hydrocarbon gas fuel 17 and the second hydrocarbon gas fuel 64 consist essentially of methane" means that any gas other than methane that is present in the system 10 as a gaseous fuel is incidental and does not alter the performance of the system 10 using 100% of the gaseous fuel as methane.

The combustor chamber 50 may be configured to receive and mix air 62 and the second hydrocarbon fuel 64 before combusting them. In some embodiments, the combustion chamber 50 may be configured to mix the liquid fuel mixture 21 introduced from the dual fuel injection system 40 with air 62 and the second hydrocarbon gas fuel 64 introduced through combustion chamber inlet 52. Accordingly, in some embodiments, the method may include mixing air 62 and the second hydrocarbon fuel 64 with the liquid fuel mixture 21 injected through the nozzle 42. Inside the combustion chamber 50, the sprayed liquid fuel mixture 21 may atomize into small particles, and subsequently react with the oxidizer to release heat. Without being bound by any theory, the inventors believe that the atomization of liquid fuel mixture 21 allows a more homogenous combustion than a standard combustion using separate injection of liquid and gaseous hydrocarbon fuels. The combustion chamber 50 may be further configured to ignite the mixture to create a flow of combustion gases to be discharged through a combustion chamber exhaust outlet 54. Although only a single combustion chamber 50 is shown in the FIG. 1, the system 10 may include one or more combustion chambers 50.

In some of the embodiments wherein the combustion chamber inlet 52 is used for the intake of both air 62 and the second hydrocarbon gas fuel 64, the second hydrocarbon gas fuel 64 may be introduced along with air 62, or the injection timings of the second hydrocarbon gas fuel 64 may be spaced out from the injection timing of air 62.

Figure 4:
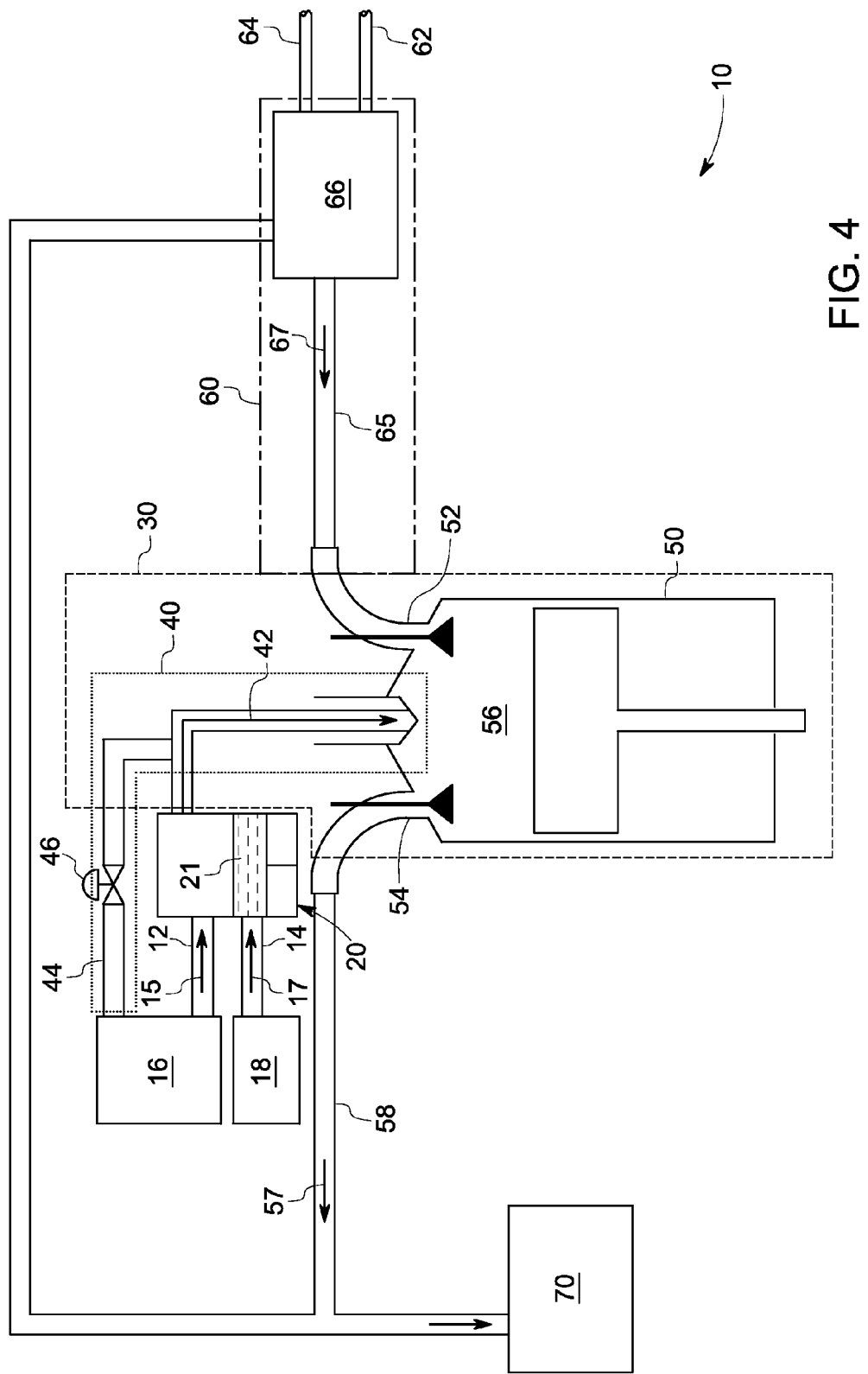
FIG. 4 is a perspective view of a system including a compressor, combustion engine, and an input system including pre-mixer, according to an embodiment of the present invention.

In some embodiments, the input system 60 may further include a pre-mixer 66 configured to mix air 62 and the second hydrocarbon gas fuel 64, as shown in FIG. 4. In some embodiments, the method of operating the system 10 may include pre-mixing air 62 and the second hydrocarbon gas fuel 64 in the pre-mixer 66 of the input system 60 to form a gas fuel mixture 67 upstream of the combustion chamber 50, and injecting the gas fuel mixture 67 into the combustion chamber 50. This gas fuel mixture 67 may be injected into the combustion chamber 50 through the combustion chamber inlet 52. The input system 60 may further include a port injection system 65 configured to inject the gas fuel mixture 67 into the combustion chamber 50. In some embodiments, the method may include mixing the gas fuel mixture 67 with the liquid fuel mixture 21 in the combustion chamber 50.

Without being bound by any theory, it is believed that introducing a second hydrocarbon gas fuel along with the liquid fuel mixture 21 in the combustion chamber may allow for higher than 50 wt % substitution rates of gaseous fuels in the liquid hydrocarbon fuel 15. In some embodiments, the combustion engine 30 may be configured to operate at a substitution rate in a range from about 50 wt % to about 99 wt % of the liquid hydrocarbon fuel 15. In some embodiments, the method may include operating the combustion engine 30 at a substitution rate in a range from about 50 wt % to about 99 wt % of the liquid hydrocarbon fuel 15. In certain embodiments, the combustion engine 30 may be operated at a substitution rate in a range from about 75 wt % to about 99 wt % of the liquid hydrocarbon fuel.

As used herein the term "substitution rate of 99 wt % of the liquid hydrocarbon fuel 15" refers to a fuel composition including 1 wt % of the liquid hydrocarbon fuel and 99 wt % of a hydrocarbon gas fuel, where the hydrocarbon gas fuel may be the first hydrocarbon gas fuel 17, the second hydrocarbon gas fuel 64, or a combination thereof. A person skilled in the art would understand that while the embodiments described here include first and second hydrocarbon fuels, there may be possibility of using more than two hydrocarbon fuels, either as mixtures with the first and second hydrocarbon fuels or by injecting through separate nozzles or injection systems.

In some embodiments, depending upon the amount of the second hydrocarbon gas fuel injected into the combustion chamber, the percentage nominal flow rate of the liquid fuel mixture 21 and the liquid hydrocarbon fuel 15 in the nozzle 42 may be varied. For example, if a total fuel (the liquid hydrocarbon fuel, the first hydrocarbon gas fuel 17 and the second hydrocarbon gas fuel) introduced into the combustion engine 50 at any given point of time is 100%, and x % of the total fuel is introduced to the combustion chamber 50 as the second hydrocarbon gas fuel, then (100–x) % of the total fuel is introduced as liquid fuel mixture 21 through the nozzle 42. In such a scenario, the percentage nominal flow rate of the nozzle 42 is considered as (100–x) %. Further, in such a scenario, if the liquid fuel mixture includes about y % of the first hydrocarbon gas fuel, then the percentage nominal flow rate of the liquid hydrocarbon fuel 15 into the combustion chamber 50 is (100–x–y) %. Thus, as the substitution rate of the first hydrocarbon gas fuel 17 in the liquid fuel mixture 21 or the second hydrocarbon gas fuel 64 in the total fuel of the combustion chamber increases, the percentage of the nominal flow rate of the liquid hydrocarbon fuel 15 may decrease. When a gaseous fuel is introduced as the first hydrocarbon gas fuel 17 and further as the second hydrocarbon gas fuel 64, the combustion engine 30 may be operated while maintaining a very small percentage of the nominal flow rate of the liquid hydrocarbon fuel 15 to the combustion chamber 50.

In embodiments wherein the second hydrocarbon gas fuel 64 has an identical chemical composition as the first hydrocarbon gas fuel 17, an overall substitution of the first (or second) hydrocarbon gas fuel in the total fuel used is much higher than that can be achieved through only dissolution of the first hydrocarbon gas fuel 17 with the liquid hydrocarbon fuel 15 in the compressor 20. In some embodiments, methane may be used as both the first hydrocarbon gas fuel 17 and the second hydrocarbon gas fuel, and injected into the combustion chamber 50 through the nozzle 42 as a part of the liquid fuel mixture 21 and also through the input system as a part of the gas fuel mixture 67. In some such embodiments, diesel may be used as the liquid hydrocarbon fuel. In some embodiments, by operating the system 10 in this mode, a very high substitution rate of the methane in the diesel can be used for combustion, while reducing the percentage nominal flow rate through the nozzle 42 and further reducing the percentage nominal flow rate of the diesel through nozzle 42, without having substantial risk of misfire or knocking. For example, if the liquid fuel mixture injected into the combustion chamber includes about 50 wt % diesel and 50 wt % methane, a 95 wt % overall substitution rate can be achieved in the combustion chamber 50 with a 10% nominal flow rate of the liquid fuel mixture 21 in the nozzle 42.

Therefore, in some embodiments, in certain kinds of combustion engines such as, for example gas engines, a nominal flow rate of the liquid fuel mixture 21 through the nozzle 42 can be reduced and more hydrocarbon gas may be introduced as the second hydrocarbon gas fuel 64, thereby enabling a high substitution rate in the combustion chamber 50. In some embodiments, the nominal flow rate of the liquid fuel mixture 21 through the nozzle 42 may be reduced to less than about 1% without interrupting the ignition or operation of the combustion engine. In some embodiments, the nozzle is configured to inject the liquid fuel mixture into the combustion chamber at a flow rate in a range from about 0.01% to about 100% of the nominal flow rate. Thus the liquid fuel mixture may be injected into the combustion chamber at a flow rate in a range from about 0.01% to about 100% of the nominal flow rate.

Referring again to FIG. 3, in some embodiments, an exhaust outlet 54 of the combustion chamber 50 may be fluidly connected to the input system 60 and configured to circulate at least a portion of an exhaust gas stream 57 emitted from the combustion chamber 50, to the input system 60. The exhaust gas stream 57 may be circulated through a conduit 58. In some embodiments, the conduit 58 may circulate at least a portion of the exhaust gas stream 57 from the combustion engine 30 into the input system 60, either to the port injection system 65 as shown in FIG. 2 or to the pre-mixer 66 as shown in FIG. 4, and may direct another portion to a storage system 70 for further usage elsewhere. In some embodiments, all of the exhaust gas steam 57 is used for recirculation through the conduit 58 to the input system 60. In some embodiments, a portion of the exhaust gas may be delivered to a turbine (not shown), thereby driving the turbine to produce mechanical work to drive the compressor 20. Other configurations of the system 10 for the usage of the exhaust gas may be used herein.

In some embodiments, a system 10 is presented. Referring again to FIGS. 2 and 3, the system 10 includes a compressor 20 configured to mix and compress diesel and a first methane gas, thereby dissolving at least a portion of the first methane gas in the diesel to form a liquid fuel mixture 21. The combustion engine 30 disposed downstream of the compressor 20 includes the dual fuel injection system 40 including the nozzle 42 that is configured to inject the liquid fuel mixture 21 into the combustion chamber 50 of the combustion engine 30. The input system 60 is fluidly connected with the combustion engine 30, and includes a pre-mixer 66 configured to mix air 62 and a second methane gas to produce a gas fuel mixture. The input system 60 is further configured to inject the gas fuel mixture 67 into the combustion chamber 50. As used herein, the terms "first methane gas" and the "second methane gas" are used to refer to different portions of the methane gas, and in no way differentiate the chemical composition of the methane gas used. Thus, in certain embodiments, the first methane gas and the second methane gas used herein have an identical chemical composition.

In some embodiments, injecting liquid fuel mixture 21 through the nozzle 42 may advantageously provide one or more benefits including: elimination of any pre-mixer system and a gas injection system upstream of the nozzle 42; a flexible operation compared to a fuel mixture having gas, especially allowing easy switching from pure liquid fuel to the dual fuel operation; and allowing a smooth transition from liquid fuel to the liquid fuel mixture from one cycle to another cycle by changing a mixture ratio upstream in the compressor 20. Further, in some of the embodiments described herein, there may be negligible gaseous intake through the nozzle 42, thereby reducing a risk of knocking or misfire. Further, a variation of flow rate of the fuel in the nozzle 42, when the first hydrocarbon gas fuel 17 is introduced as a part of the liquid fuel mixture 21 may be minimal.

Furthermore, in accordance with some embodiments of the invention, the benefits of introducing the gaseous fuels by dissolution in a liquid fuel in the compressor 20 and also in the gaseous form through the combustion chamber inlet 52 may include one or both of: achieving higher level of substitution rate and a simple control of an amount of the liquid hydrocarbon fuel 15 injected. This is in comparison to a gaseous hydrocarbon fuel introduced only through the combustion inlet 52 or only as a part of the liquid fuel mixture 21 through the nozzle 42. Therefore, in accordance with some embodiments of the invention, a given emission level may be targeted and required amount of the hydrocarbon gas may be substituted as a first hydrocarbon gas fuel 17 or a combination of the first hydrocarbon gas fuel 17 and the second hydrocarbon gas fuel 64.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system, comprising:
a compressor configured to mix and compress a liquid hydrocarbon fuel and a first hydrocarbon gas fuel, thereby dissolving at least a portion of the first hydrocarbon gas fuel in the liquid hydrocarbon fuel to form a liquid fuel mixture;
a combustion engine disposed downstream of the compressor, comprising a dual fuel injection system comprising a nozzle configured to inject the liquid fuel mixture into a combustion chamber of the combustion engine; and
an input system fluidly connected with the combustion engine, and configured to inject air and a second hydrocarbon gas fuel into the combustion chamber.

2. The system of claim 1, wherein the input system comprises a port injection system configured to inject a gas fuel mixture of air and the second hydrocarbon gas fuel into the combustion chamber.

3. The system of claim 2, wherein the input system comprises a pre-mixer configured to mix the air and the second hydrocarbon gas fuel.

4. The system of claim 1, wherein an exhaust outlet of the combustion chamber is fluidly connected to the input system, and configured to circulate at least a portion of an exhaust gas stream to the input system.

5. The system of claim 1, wherein the liquid hydrocarbon fuel comprises diesel.

6. The system of claim 1, wherein at least one of the first hydrocarbon gas fuel and the second hydrocarbon gas fuel comprises methane.

7. The system of claim 1, wherein both the first hydrocarbon gas fuel and the second hydrocarbon gas fuel comprise methane.

8. The system of claim 1, wherein the liquid fuel mixture comprises 1 wt % to 50 wt % of the first hydrocarbon gas fuel.

9. The system of claim 1, wherein the dual fuel injection system further comprises a liquid hydrocarbon fuel conduit fluidly connecting a liquid hydrocarbon fuel source to the nozzle via a control valve.

10. The system of claim 1, wherein the nozzle is configured to inject the liquid fuel mixture into the combustion chamber at a flow rate in a range from 0.01% to 100% of a nominal flow rate.

11. The system of claim 1, wherein the combustion engine is configured to operate at a substitution rate in a range from 50 wt % to 99 wt % of the liquid hydrocarbon fuel.

12. A system, comprising:
a compressor configured to mix and compress diesel and a first methane gas, thereby dissolving at least a portion of the first methane gas in the diesel to form a liquid fuel mixture;
a combustion engine disposed downstream of the compressor, comprising a dual fuel injection, system comprising a nozzle configured to inject the liquid fuel mixture into a combustion chamber of the combustion engine; and
an input system fluidly connected with the combustion engine, and comprising a pre-mixer configured to mix air and a second methane gas to produce a gas fuel mixture, wherein the input system is configured to inject the gas fuel mixture into the combustion chamber.

13. A method, comprising:
mixing and compressing a liquid hydrocarbon fuel and a first hydrocarbon gas fuel in a compressor, thereby dissolving at least a portion of the first hydrocarbon gas fuel in the liquid hydrocarbon fuel to form a liquid fuel mixture;
injecting the liquid fuel mixture into a combustion chamber of a combustion engine through a nozzle of a dual fuel injection system of the combustion engine; and
injecting air and a second hydrocarbon gas fuel into the combustion chamber through an input system fluidly connected with the combustion engine.

14. The method of claim 13, comprising compressing the liquid hydrocarbon fuel and first hydrocarbon gas fuel in the compressor at a pressure in a range from 5 MPa to 250 MPa.

15. The method of claim 13, further comprising maintaining a temperature of the compressor in a range from −160° C. to 200° C. during one or both of the mixing and the compressing steps.

16. The method of claim 13, further comprising pre-mixing air and the second hydrocarbon gas fuel in a pre-mixer of the input system to form a gas fuel mixture upstream of the combustion chamber, and injecting the gas fuel mixture into the combustion chamber.

17. The method of claim 13, wherein the step of injecting the liquid fuel mixture into the combustion chamber comprises injecting the liquid fuel mixture comprising 1 wt % 50 wt % of the first hydrocarbon gas fuel.

18. The method of claim 13, wherein the liquid fuel mixture is injected into the combustion chamber at a flow rate in a range from 0.01% to 100% of a nominal flow rate.

19. The method of claim 13, further comprising operating the combustion engine at a substitution rate in a range from 50 wt % to 99 wt % of the liquid hydrocarbon fuel.

20. The method of claim 13, further comprising circulating at least a portion of an exhaust gas stream from the combustion engine into the input system.

\* \* \* \* \*